United States Patent Office 3,213,125
Patented Oct. 19, 1965

3,213,125
SUBSTITUTED 1,3-DIENES AND PROCESS FOR PREPARING THE SAME
Richard Parke Welcher, Old Greenwich, Conn., assignor to American Cyanamid Company, Stamford, Conn., a corporation of Maine
No Drawing. Filed Sept. 19, 1962, Ser. No. 224,861
5 Claims. (Cl. 260—465.8)

This invention relates to novel substituted 1,3-dienes and to a process for preparing the same. In a more particular aspect, this invention relates to novel 1,3-dienes having one to four functional substituents on the terminal carbon atoms of the diene and to a process for preparing the same. In a still more particular aspect, this invention relates to novel substituted 1,3-dienes of the formula:

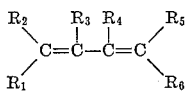

in which the substituents $R_1$, $R_2$, $R_5$ and $R_6$ are each selected from the group consisting of hydrogen, alkyl, alkenyl, aryl, alkaryl, aralkyl, cycloalkyl, cycloalkenyl, and cyanoethyl with the proviso that at least one of the $R_1$, $R_2$, $R_5$ and $R_6$ substituents is cyanoethyl and $R_3$ and $R_4$ are each selected from the group consisting of hydrogen, alkyl, alkenyl, aryl, alkaryl, aralkyl, cycloalkyl, and cycloalkenyl. From the structural representation of the novel compounds of the present invention, it will be seen that the substituted 1,3-dienes of this invention are compounds in which at least one cyanoethyl grouping is attached to the terminal carbon atoms adjacent to which is a double bond.

To the present, substituted 1,3-dienes having a cyanoethyl substituent are unknown. Attempts to prepare cyanoethylated derivatives of 1,3-dienes have been unsuccessful in that when acrylonitrile is heated with an aliphatic or acyclic compound containing a system of conjugated carbon double bonds, cyclic products are obtained. Thus, acrylonitrile, which acts as a dienophile in the Diels-Alder synthesis, reacts with 1,3-butadiene to produce 3-cyclohexene-1-carbonitrile, with piperylene to produce 2-methyl-3-cyclohexene-1-carbonitrile and 5-methyl-3-cyclohexene-1-carbonitrile and with 1-phenyl-1,3-butadiene to produce 2-phenyl-3-cyclohexene-1-carbonitrile.

In accordance with the present invention, it has now been discovered that substituted 1,3-dienes of the formula hereinabove having one to four cyanoethyl substituents on the terminal carbon atoms of the diene may be readily prepared in excellent yield by pyrolysis of the corresponding unsaturated substituted cyclic sulfone of the formula:

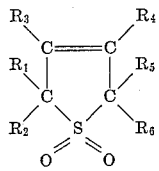

in which the substituents $R_1$ to $R_6$, inclusive, are as defined hereinabove. Thus, in carrying out the process of the present invention for the preparation of the novel substituted 1,3-dienes, an unsaturated substituted cyclic sulfone is subjected to temperatures in excess of 50° C. for a minimum period of actual contact time. The resultant substituted 1,3-diene is then usually recovered from the crude reaction mixture. As a result of this simple expeditious process, substituted 1,3-dienes having one or more cyanoethyl substituents thereon are obtained in excellent yields and are substantially free of contaminating by-products resulting from the pyrolysis procedure. The temperature at which the unsaturated substituted cyclic sulfone may be pyrolyzed may vary from about 50° C. up to about 300° C. The pyrolysis temperature may even be in excess of 300° C. if so desired but no particular advantage is seen in conducting the pyrolysis at these higher temperatures. Preferably, the temperature range of pyrolysis is between about 100° C. and about 250° C. depending upon the melting point and dissociation velocity constant of the unsaturated substituted cyclic sulfone starting material with the temperatures chosen to give a practical rate of decomposition.

Pyrolysis times ranging from fractions of a second up to several days may be employed. Such times are dependent upon various factors, e.g., dissociation velocity constant of the unsaturated substituted sulfone starting material, temperature and pressure. In general, however, minimum pyrolysis times or contact periods are preferred, especially at higher temperatures, in order to minimize undesirable side reactions.

While pyrolysis is accomplished merely by subjecting the unsaturated substituted cyclic sulfone to temperatures in excess of about 50° C., it is also within the scope of this invention to employ a catalyst. However, the use of a catalyst is not generally necessary since the present pyrolysis procedure affords high yields of substituted 1,3-dienes having one or more cyanoethyl substituents even without the use of catalytic masses.

The pyrolysis may be carried out in any suitable pyrolytic apparatus which will afford proper temperature control, for example, in a heated tube or other vessel. Such heated tube may be constructed of thermally resistant glass, quartz, inert metal or the like.

The pyrolysis may be carried out at atmospheric or reduced pressures. Pressures above atmospheric are generally undesirable in the process since there is a tendency for dissociation of the unsaturated substituted cyclic sulfone to be slowed down. Ordinarily, reduced pressures will be employed in order to remove sulfur dioxide as it is formed during the pyrolysis and thus lessen the chance of side reactions.

The use of a solvent or solvents for the unsaturated cyclic sulfone during the pyrolysis procedure is not generally necessary but is not precluded. If desired, a solvent may be employed to provide better heat transfer and thus provide a faster rate of decomposition at a given temperature. As the term is used herein, "solvent" is intended to embrace a material which acts as a true solvent or as a suspension medium and any inert organic solvent such as aromatic or paraffinic hydrocarbons, alcohols, ethers, etc., may be used as long as the boiling point of the solvent or suspension medium is high enough to permit heating the unsaturated substituted cyclic sulfone to decomposition temperature and as long as the solvent or suspension medium does not react with the substituted 1,3-dienes, with the nitrile group or groups of the cyanoethyl moieties or with the sulfur dioxide evolved. It is generally desirable to vent the sulfur dioxide liberated from the pyrolyzed unsaturated substituted cyclic sulfone since if it is allowed to remain in contact with the product 1,3-diene it may possibly cause regeneration of the starting sulfone or other unwanted products, e.g., polymeric diene sulfones.

During the pyrolysis, it is frequently advantageous to employ an inhibitor in order to forestall possible thermal polymerization of the resultant 1,3-diene. The pyrolysis of certain sulfones having unsaturated substituents therein will ordinarily be conducted in the presence of such an inhibitor. An inhibitor such as hydroquinone, t-butyl catechol, naphthylamine, etc. may be employed usually in an amount of from about 0.01 to about 10 mole percent based upon the sulfone.

Following the completion of the pyrolysis, the product, substituted 1,3-diene, is removed from the pyrolytic apparatus and is subsequently purified by conventional means. Thus, the substituted 1,3-dienes which have been substituted with one or more cyanoethyl groupings can be isolated from the reaction mixture and purified in a conventional manner, for example, by distillation, sublimation, recrystallization, selective extraction, selective adsorption or the like.

The starting unsaturated substituted cyclic sulfones, which may be prepared by reaction of acrylonitrile with a suitable unsaturated cyclic sulfone having one or more hydrogen atoms attached to the 2- or 5-nuclear carbon atoms thereof, are described and claimed in my copending application Serial No. 224,859, filed concurrently herewith.

As noted in said concurrently filed application, typical unsaturated cyclic sulfones which may be reacted with acrylonitrile to form the starting unsaturated substituted cyclic sulfones of the process of the present invention include the following: butadiene sulfone, piperylene sulfone, isoprene sulfone, 2,4-hexadiene sulfone, 2-ethyl butadiene-1,3 sulfone, 2-methyl-pentadiene-1,3 sulfone, and their homologs, as well as other sulfone compounds in which hydrocarbon radicals, such as methyl, ethyl, vinyl, propyl, isopropyl, propenyl, allyl, isopropenyl, butyl, isobutyl, butenyl, isobutenyl, pentenyl, amyl, hexyl, isohexyl, isohexenyl, cyclobutyl, cyclopentyl, cyclohexyl, cyclopentenyl, cyclohexenyl, phenyl, benzyl, tolyl, xylyl and other like radicals are substituted for one or more of the hydrogen atoms of the unsubstituted cyclic sulfone compounds.

Illustrative unsaturated substituted cyclic sulfones which may be employed in the process of this invention are found in the following non-limiting listing:

2,2,5,5-thiophenetetrapropionitrile-1,1-dioxide,
2,2-thiophenedipropionitrile-1,1-dioxide,
2,2,5-thiophenetripropionitrile-1,1-dioxide,
2-thiophenepropionitrile-1,1-dioxide,
3-methyl-2,2,5,5-thiophenetetrapropionitrile-1,1-dioxide,
2-methyl-2,5,5-thiophenetripropionitrile-1,1-dioxide,
2,5-dimethyl-2,5-thiophenedipropionitrile-1,1-dioxide,
2,5-diphenyl-2,5-thiophenedipropionitrile-1,1-dioxide,
3,4-diphenyl-2,2,5,5-thiophenetetrapropionitrile-1,1-dioxide,
5-vinyl-2,2,5-thiophenetripropionitrile-1,1-dioxide,
5-cyclohexyl-2,2-thiophenedipropionitrile-1,1-dioxide,
5-cyclohexenyl-2,2-thiophenedipropionitrile-1,1-dioxide, and the like.

If desired, the product 1,3-dienes may be obtained directly by pyrolysis of the crude reaction products resulting from the reaction of acrylonitrile with an unsaturated substituted cyclic sulfone, the process for preparing these reaction products being also described and claimed in my copending application filed concurrently herewith and referred to supra.

The novel substituted 1,3-dienes of this invention are useful as monomers and comonomers and as plasticizers for polyacrylonitrile. Derivatives of the substituted 1,3-dienes, e.g., polyamines which are obtainable by hydrogenation and polycarboxylic acids which are obtainable by hydrolysis, are valuable as complexing agents.

In order to further illustrate the nature of the present invention, the following non-limiting examples are given:

*Example 1*

8.9 parts (0.027 mole) of 2,2,5,5-thiophenetetrapropionitrile-1,1-dioxide is heated in a suitable vessel at reduced pressure (0.08–0.4 mm.) at 195–205° C. for four hours, during which period gas is evolved. The residue is a crystalline solid. After recrystallization from acetonitrile, the 4,7-bis-(2'-cyanoethyl)-4,6-decadienedinitrile melts at 150–151° C.

*Analysis.*—Calculated for $C_{16}H_{18}N_4$: C, 72.15; H, 6.81; N, 21.04; mol. weight, 266. Found: C, 72.21; H, 6.47; N, 20.72; mol weight, 253.

Its infrared and ultraviolet spectra are consistent with the postulated structure.

*Example 2*

The procedure of Example 1 is repeated in all essential respects except that 2-thiophenepropionitrile-1,1-dioxide is employed in place of 2,2,5,5-thiophenetetrapropionitrile-1,1-dioxide. 4,6-heptadienenitrile is obtained.

*Example 3*

The procedure of Example 1 is repeated in all essential respects except that 2,2-thiophenedipropionitrile-1,1-dioxide is employed in place of 2,2,5,5-thiophenetetrapropionitrile-1,1-dioxide. 4-(2'-cyanoethyl)-4,6-heptadienenitrile is obtained.

*Example 4*

The procedure of Example 1 is repeated in all essential respects except that 3-methyl-2,2,5,5-thiophenetetrapropionitrile-1,1-dioxide is employed in place of 2,2,5,5-thiophenetetrapropionitrile-1,1-dioxide. 5-methyl-4,7-bis-(2'-cyanoethyl)-4,6-decadienedinitrile is obtained.

*Example 5*

The procedure of Example 1 is repeated in all essential respects except that 2-methyl-2,5,5-thiophenetripropionitrile-1,1-dioxide is employed in place of 2,2,5,5-thiophenetetrapropionitrile-1,1-dioxide. 4-(2'-cyanoethyl)-7-methyl-4,6-decadienedinitrile is obtained.

*Example 6*

The produce of Example 1 is repeated in all essential respects except that 2,5-dimethyl-2,5-thiophenedipropionitrile-1,1-dioxide is employed in place of 2,2,5,5-thiophenetetrapropionitrile-1,1-dioxide. 4,7-dimethyl-4,6-decadienedinitrile is obtained.

*Example 7*

The procedure of Example 1 is repeated in all essential respects except that 2,5-diphenyl-2,5-thiophenedipropionitrile-1,1-dioxide is employed in place of 2,2,5,5-thiophenetetrapropionitrile-1,1-dioxide. 4,7-diphenyl-4,6-decadienedinitrile is obtained.

*Example 8*

The procedure of Example 1 is followed in all essential respects except that 3,4-diphenyl-2,2,5,5-thiophenetetrapropionitrile-1,1-dioxide is employed in place of 2,2,5,5-thiophenetetrapropionitrile-1,1-dioxide. 5,6-diphenyl-4,7-bis(2'-cyanoethyl)-4,6-decadienedinitrile is obtained.

While the present invention has been described in conjunction with various preferred embodiments, it is to be understood that the invention is not to be limited to such exemplary description but is to be construed broadly and limited only by the following claims.

I claim:

1. A process for preparing a substituted 1,3-diene of the formula:

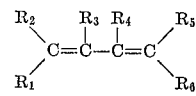

in which the substituents $R_1$, $R_2$, $R_5$ and $R_6$ are each selected from the group consisting of hydrogen, alkyl, alkenyl, aryl, alkaryl, aralkyl, cycloalkyl, cycloalkenyl and cyanoethyl with the proviso that at least one of the $R_1$, $R_2$, $R_5$ and $R_6$ substituents is cyanoethyl and $R_3$ and $R_4$ are each selected from the group consisting of hydrogen, alkyl, alkenyl, aryl, alkaryl, aralkyl, cycloalkyl, and cycloalkenyl which comprises pyrolyzing an unsaturated substituted cyclic sulfone of the formula:

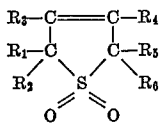

in which the substituents $R_1$ to $R_6$, inclusive, are as defined hereinabove at a temperature between about 50° C. and about 300° C.

2. A process as in claim 1 in which the temperature is between about 100° C. and 250° C.

3. A process for preparing 4,7-bis-(2'-cyanoethyl)-4,6-decadienedinitrile which comprises pyrolyzing 2,2,5,5-thiophenetetrapropionitrile-1,1-dioxide at a temperature in excess of 50° C.

4. A process for preparing 4,6-heptadienenitrile which comprises pyrolyzing 2-thiophenepropionitrile-1,1-dioxide at a temperature in excess of 50° C.

5. A process for preparing 4-(2'-cyanoethyl)-4,6-heptadienenitrile which comprises pyrolyzing 2,2-thiophenedipropionitrile-1,1-dioxide at a temperature in excess of 50° C.

References Cited by the Examiner
UNITED STATES PATENTS

| 2,485,225 | 10/49 | Webb | 260—465.8 |
| 2,540,736 | 2/51 | Kalb et al. | 260—465.4 X |
| 2,912,417 | 11/59 | Drysdale | 260—465.4 X |
| 2,956,075 | 10/60 | Boffa et al. | 260—465.8 |

OTHER REFERENCES

Reichstein et al., C.A., 26 (1932), page 2701.

CHARLES B. PARKER, *Primary Examiner*.